July 25, 1933.  F. E. PAYNE  1,919,343

DUST COLLECTOR FOR INCLOSED BRAKE

Filed March 19, 1931  2 Sheets-Sheet 1

Inventor:
Frank E. Payne
By Rector, Hibben, Davis & Macauley
Attys

July 25, 1933.  F. E. PAYNE  1,919,343
DUST COLLECTOR FOR INCLOSED BRAKE
Filed March 19, 1931  2 Sheets-Sheet 2

Inventor:
Frank E. Payne
By Keator, Hibben, Davis & Macauley
Attys.

Patented July 25, 1933

1,919,343

UNITED STATES PATENT OFFICE

FRANK E. PAYNE, OF CHICAGO, ILLINOIS

DUST COLLECTOR FOR INCLOSED BRAKE

Application filed March 19, 1931. Serial No. 523,723.

My invention relates to dust collectors for brakes of the inclosed type and is concerned generally with providing an arrangement for evacuating dust, brake band fragments, and debris in general from the interior of the brake drum.

One object of my invention is to devise a collecting means which is mounted permanently on the brake and which projects within the brake drum for contact with or close approach to the flanged periphery thereof, particles accumulating in the drum being thrown outwardly by centrifugal force against the drum flange and deflected outwardly of the drum by the collecting means.

A further object is to provide an arrangement for evacuating free particles from the interior of an inclosed brake whenever formed therein, preventing their being embedded in the working surfaces on the brake shoe faces and causing squeaky and noisy brakes, the device being further constructed to prevent the entrance therethrough into the brake of mud, sand, etc., from whatever cause.

A further object is to devise a collector of the character described which is readily adaptable to inclosed brakes of all types, regardless of the number of shoes, and whose attachment to the brake may be accomplished without requiring major changes in the brake proper.

These and further objects of my invention will be set forth in the following specification, reference being had to the accompanying drawings and the novel means by which said objects are effectuated will be definitely pointed out in the claims.

Figure 1:
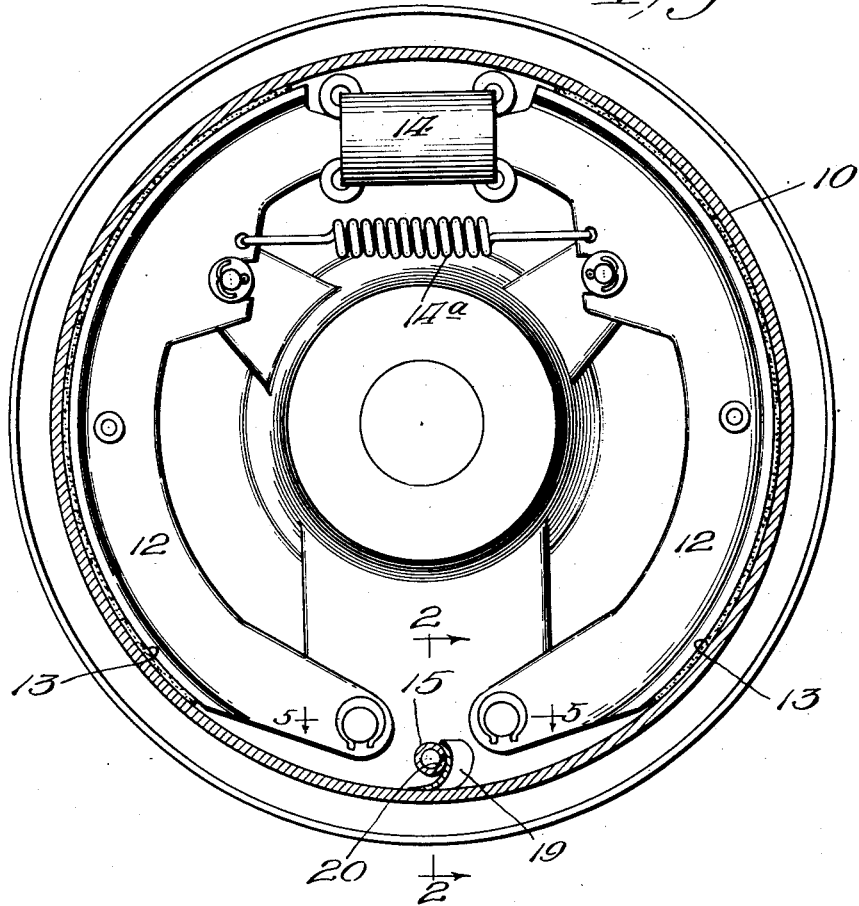
Figure 1 is a sectional elevation of an inclosed brake having two shoes and illustrating diagrammatically the application of my improved dust collector thereto.
Figure 2:
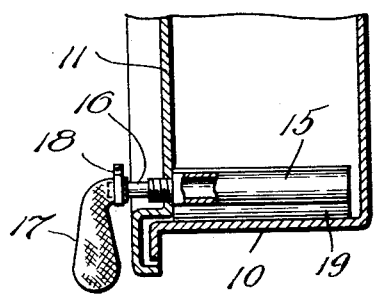
Fig. 2 is a section along the line 2—2 in Fig. 1, looking in the direction of the arrows, and showing one method of collecting the particles which are discharged externally of the brake.
Figure 5:
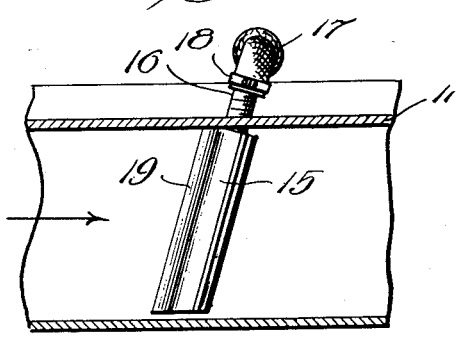
Fig. 5 is a section along the line 5—5 in Fig. 1, illustrating the angular disposition of the collecting means to the brake drum flange.

Referring to Figs. 1, 2, and 5 of the drawings, the numeral 10 designates a brake drum of the usual character which is mounted for rotation in any desired manner and which is inclosed by the customary cover plate 11. Within the drum 10 is disposed the brake shoes 12 bearing the friction strips 13 and which are arranged to be moved into braking position by the spreading means 14 and to be retracted by a spring 14ª. The precise construction of the braking mechanism per se forms no part of the present invention, for however the same is constructed and arranged, my improved dust collector will be positioned within the interior of the drum and capacitated to discharge free particles outwardly thereof.

In the two-shoe type of brake shown in Fig. 1, the collecting means is preferably disposed adjacent the lower portion of the drum between the adjacent ends of the brake shoes. Specifically, it consists of a tube 15, one end of which is mounted in the cover plate 11 with the inner portion thereof extending across the width of the drum flange. Preferably, the tube 15 is inclined to the axis of the drum, as shown clearly in Fig. 5, for a purpose hereinafter explained, and the outer end of said tube may be slightly reduced in diameter as at 16 to receive on the extreme outer end thereof a receptacle 17, shown in the present instance as taking the form of a bag, and which is secured on the end of the tube by any convenient form of clamp 18. Within the drum 10, the tube 15 carries a curved deflector plate 19, one end of which is attached to the tube 15 and the other end of which preferably rides lightly and yieldingly against the flange portion of the drum. As viewed in cross section in Fig. 1, the tube 15 and deflector 19 constitute generally a spiral formation with entrance into the interior of the tube 15 being effected through the slot 20 which is cut into the wall of the tube 15 adjacent the deflector 19. The deflector 19 may be formed of any suitable material, whether of a metallic or non-metallic nature, and it is considered to be within the generic scope of this invention to secure a collecting contact of the deflector 19 with the flange of the drum by means of springs, or to obtain any desired cooperative relationship between the deflector and the drum such that the former will serve to guide free particles into the interior of the tube 15.

In operation, and considering that the drum 10 is rotating, it will be obvious that free particles which are formed in the interior of the drum, whether due to the entrance of dust into the drum around the periphery of the cover plate, ground particles from the material composing the drum, or fragments from the brake strips 13, the same will be thrown outwardly by centrifugal force toward the flange of the brake drum and will be eventually picked up by the deflector 19 for discharge outwardly of the drum through the tube 15 into the bag 17. In the rotation of the drum 10, these free particles substantially ride around with the flange of the drum and the momentum thus imparted to them is availed of as a discharging force by the inclination of the tube 15 shown in Fig. 5, the particles striking the deflector 19 with a glancing blow and being deflected outwardly into the bag 17. It is also believed that the mass of air which is entrained in the drum is also given a motion of rotation therewith, so that the deflector 19 also gathers masses of air along with the free particles, which air serves to assist in the carriage of the particles exteriorly of the drum. In this connection, it will be understood that the bag 17, while impervious to the passage of these free particles, will readily permit the passage of air therethrough.

The foregoing arrangement serves very effectively to constantly evacuate free particles, which are usually of an abrasive nature, from the interior of the drum, thus preventing their being embedded in the brake strips 13, causing noisy brakes, as well as increasing the wear on the drum. The application of this structure to any standard form of brake mechanism does not require any changes in the braking structure, as it is only necessary to drill a hole in the cover plate 11 to receive the tube 15.

Figure 4:
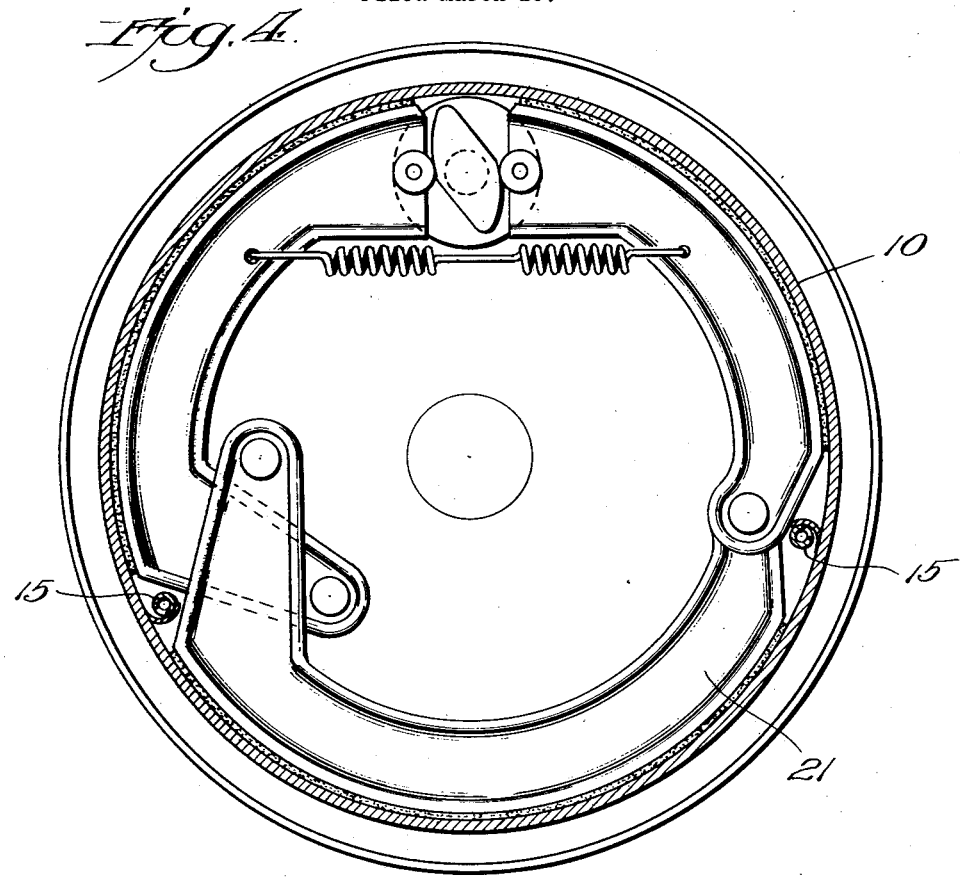
Fig. 4 is a view similar to Fig. 1, but illustrating a three-shoe, inclosed brake with my improved collector attached thereto.

In Fig. 4 is shown the application of my improved collecting means to a brake mechanism which is provided with three shoes. In this particular arrangement, the disposition of one of the shoes 21 in the lower portion of the drum 10 prevents the location of the collecting structure in the lower portion of said drum, but a very effective solution can be had by utilizing two sets of collecting means, each of which is located in the space between an end of the lower shoe 21 and the end of an adjacent shoe. The particular construction of the collecting means in this instance is identical with that above described.

Figure 3:
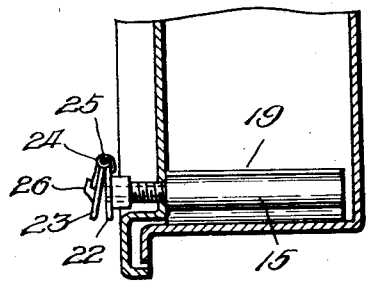
Fig. 3 is a view similar to Fig. 2, but showing a modified arrangement employing a flap valve structure which permits free discharge of particles externally of the brake, but prevents any movement of particles, accompanied by pressure, into the interior of the brake.

In Fig. 3 is shown a novel method of arranging the external end of the tube 15. This modification contemplates the elimination of the bag 17 which obviously must be removed from time to time in order to clear its contents. The solution proposed in this particular form is to provide a flange 22 on the outer end of the tube 15 and to pivotally mount on the upper side thereof a cover in the form of a flap valve 23. This valve is normally maintained in the slightly open position shown in Fig. 3 by means of a spring 24 which is coiled around the pin 25 which serves to pivotally support said valve, one arm of the spring engaging with a hook 26 on the valve 23 and the other arm of said spring being bent around the back of the flange 22. In the normally opened position of the valve 23, the deflector plate 19 may gather the free particles within the drum for discharge outwardly thereof in the normal operation of the device, but the valve 23 will instantly close against any form of external pressure, such as when the wheel carrying the brake drum may become mired, and therefore will prevent entrance of mud and sand into the interior of the drum.

While I have shown one set of elements and combinations thereof for effectuating my improved dust collecting device for enclosed brush, it will be understood that the same is intended for purpose of illustration only and in nowise to restrict my arrangement to the precise forms and structures shown, for many changes may be made therein without departing from the spirit of my invention.

I claim:

1. The combination with a brake of the inclosed type having a rotatable drum and a fixed cover plate therefor, of means projecting within said drum, said means bearing lightly against the flange of said drum and acting substantially as a scoop for collecting and discharging free particles externally of the brake.

2. The combination with a brake of the inclosed type having a rotatable drum and a fixed cover plate therefor, of means projecting within said drum, the portion of said means within said drum having substantially a spiral cross section with the free end thereof bearing lightly against the flange of said drum and acting substantially as a scoop for collecting and discharging free particles externally of the brake.

3. The combination of a brake of the inclosed type having a rotatable drum and a fixed cover plate therefor, of means projecting within said drum, said means bearing lightly against the flange of said drum and acting substantially as a scoop for collecting and discharging free particles externally of the brake, the axis of said means being angularly disposed to the axis of the drum.

4. The combination with a brake of the inclosed type having a rotatable drum and a fixed cover plate therefor, of means projecting within said drum, said means bearing lightly against the flange of said drum and acting substantially as a scoop for collecting and discharging free particles externally of the brake, the axis of said means making substantially an obtuse angle with the direction of movement of the drum flange in the region of said flange which is contacted by said means.

5. The combination with a brake of the inclosed type, of means projecting within the interior of the brake and adapted to collect free particles for discharge externally of the brake, and means for preventing ingress of particles into the brake from the outside through said means.

6. The combination with a brake of the inclosed type having a rotatable drum and a fixed cover plate therefor, of means projecting within said drum, said means bearing lightly against the flange of said drum and acting substantially as a scoop for collecting and discharging free particles externally of the brake, and means attached to the external end of said collecting means for preventing ingress of particles into the brake from the outside through said collecting means.

7. The combination with a brake of the inclosed type having a rotatable drum and a fixed cover plate therefor, of means projecting within said drum, said means bearing lightly against the flange of said drum and acting substantially as a scoop for collecting and discharging free particles externally of the brake, and a detachable receptacle mounted on the external end of said collecting means.

8. The combination with a brake of the inclosed type, of means projecting within the interior of the brake, said means bearing lightly against the brake drum and acting substantially as a scoop for collecting and discharging free particles externally of the brake.

9. The combination with a brake of the inclosed type, of means projecting within the interior of the brake and adapted to collect free particles for discharge externally of the brake, and a detachable receptacle mounted on the external end of said collecting means.

10. The combination with a brake of the inclosed type, of means projecting within the interior of the brake and adapted to collect free particles for discharge externally of the brake, and a bag detachably mounted on the external end of said collecting means.

11. The combination with a brake of the inclosed type, of means projecting within the interior of the brake and adapted to collect free particles for discharge externally of the brake, conduit means connecting said collecting means with the atmosphere, and outwardly opening, check valve means located on the end of said conduit means to permit discharge of said particles and to prevent ingress of particles through said valve means.

12. The combination with a brake of the inclosed type having a rotatable drum and a fixed cover plate therefor, of means projecting within said drum, the portion of said means within said drum having substantially a spiral cross-section with the free end thereof bearing lightly against the flange of said drum and acting substantially as a scoop for collecting and discharging free particles externally of the brake, the axis of said means being angularly disposed to the axis of the drum.

FRANK E. PAYNE.